United States Patent Office 3,410,099
Patented Nov. 12, 1968

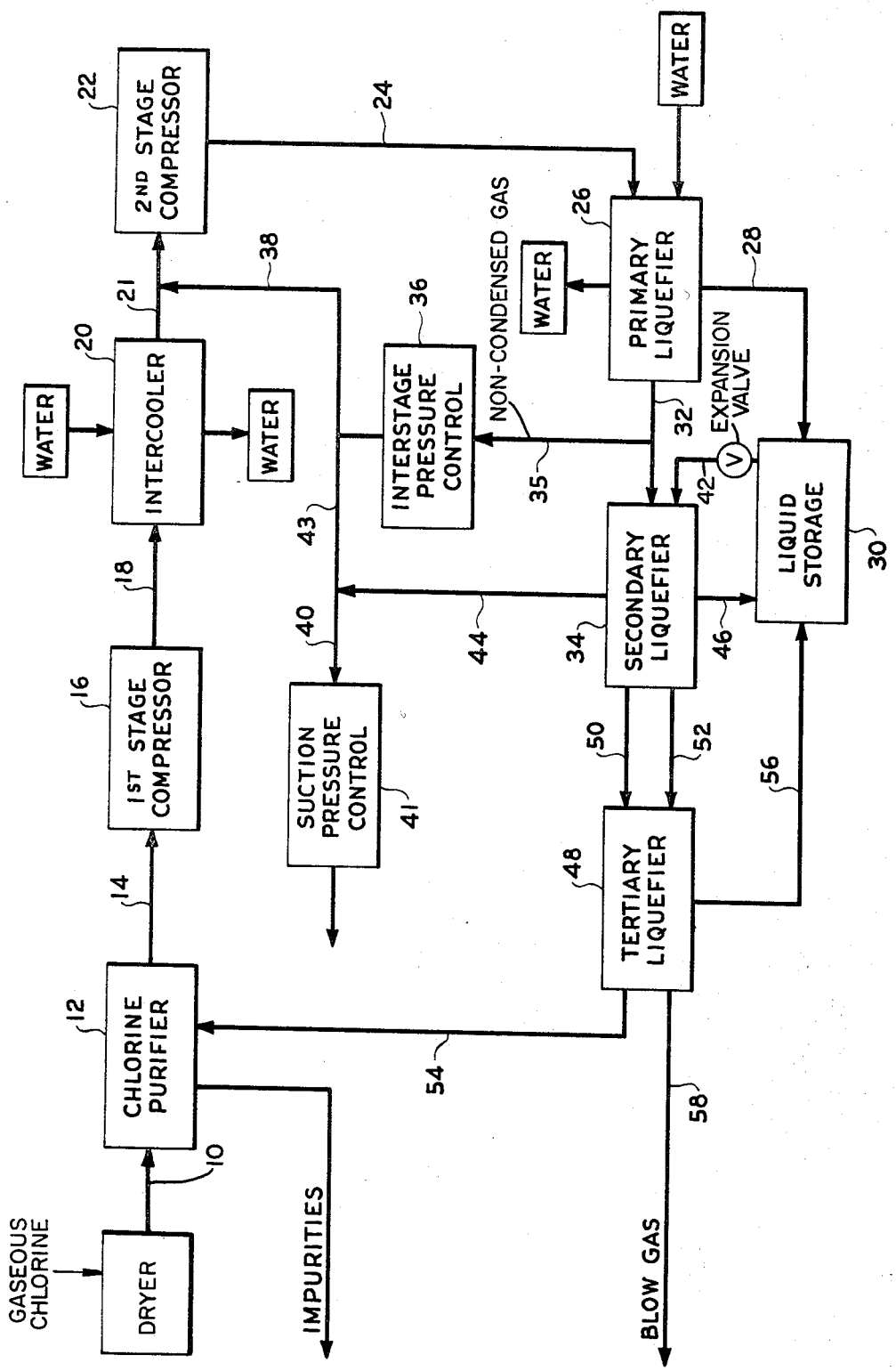

3,410,099
CHLORINE LIQUEFACTION
Thomas Hooker, Youngstown, and John E. Currey, Niagara, Falls, N.Y., assignors to Hooker Chemical Corporation, Niagara Falls, N.Y., a corporation of New York
Filed Apr. 7, 1965, Ser. No. 446,332
3 Claims. (Cl. 62—9)

ABSTRACT OF THE DISCLOSURE

Gaseous chlorine is initially cooled and impurities are removed therefrom. The chlorine is compressed in plural stages and a major portion is liquefied through heat exchange with water. A portion of the remaining gaseous chlorine is passed through interstage pressure control to a further compression stage while another portion of gaseous chlorine is liquefied by heat exchange with vaporizing liquid chlorine. The vaporized liquid chlorine passes to compressor suction pressure control while the unvaporized portion of liquid chlorine is used in a further heat exchange step to condense the remaining chlorine gas.

---

This invention relates to the liquefaction of chlorine gas and, more particularly, to a novel process for cooling and condensing dry chlorine gas without the requirement of special refrigerants and the associated refrigerant compressors.

Chlorine gas is most frequently produced by electrolytic processes, such as the electrolytic decomposition of sodium chloride or hydrochloric acid. Such electrolytic processes produce chlorine gas in a hot humid stream. In most instances, the chlorine gas cannot be used in such a condition nor is it frequently used at the same rate at which it is evolved from an electrolytic process. Therefore, it is preferred to dry the chlorine and condense it to a liquid suitable for storage in steel containers, thereby providing a source of chlorine convertible to gas form as it is needed.

Various processes have been developed for the drying and partial cooling of the humid chlorine gas evolved from electrolytic cells. Such processes normally involve scrubbing the gas with water to cool and partially dehumidify it and subsequently passing the gas through strong sulfuric acid to further dry it.

The production of liquid chlorine from dry chlorine cell gas requires the removal of heat to an extent such that the temperature is lowered below the dew point of chlorine. Because chlorine has an atmospheric boiling point of −34.6 degrees centigrade, extensive refrigeration, considerable pressure, or a suitable combination thereof is required to liquefy chlorine. Most previous chlorine liquefaction processes combined moderate pressures of 25 to 35 pounds per square inch gauge with extensive refrigeration, because the cost of compressing refrigerants is normally less than that required for compressing chlorine. As a result, independent systems were used for compressing, condensing, and storing both the refrigerant and the chlorine. To insure process continuity, extensive spare equipment was usually provided for both systems.

It is an object of this invention to provide a simplified method of liquefying chlorine by utilizing chlorine as an indirect refrigerant. Another object is to provide a process for liquefying chlorine wherein the use of refrigerants other than water and liquid chlorine are eliminated. A further object is to effect an overall chlorine liquefaction process simplification, wherein a reduction in the power requirement is realized and wherein the capital investment, operating and maintenance expenses are decreased. These and other objects will become apparent to those skilled in the art from the description of the invention which follows.

In accordance with the invention a process is provided for liquefying chlorine gas comprising compressing purified chlorine gas to a superatmospheric pressure, effecting an indirect heating exchange between the pressurized gas and coolant to reduce the pressurized gas temperature to less than about 40 degrees centigrade, thereby liquefying a portion of said pressurized gas and further cooling said pressurized gas by passing volatilizing liquid chlorine in indirect heat exchange relationship with said pressurized gas thereby effecting a further condensation of said pressurized gas. The process is readily effected using one or more compression stages and two or more heat exchanges.

The present invention provides considerable advantages over previous chlorine liquefaction processes. The process is particularly advantageous in reducing equipment requirements, capital investment, the maintenance of such equipment, reduced power requirements and in contributing to the overall simplification of chlorine liquefaction processes. Thus, compressor units for refrigerant materials such as ammonia or Freons, which have previously been used, are eliminated. Also, the danger of contamination of the liquefied chlorine with refrigerant is eliminated.

The invention is further described with reference to the drawing which is a flow sheet illustrating the process of the invention.

In the present process, the gaseous chlorine is passed via line 10 to chlorine purifier 12. The gaseous chlorine is obtained from a convenient source of chlorine which chlorine has preferably been dried by conventional means. Normally, chlorine gas made in electrolytic cells is the source of chlorine. This chlorine gas is normally saturated with water or is in a humid condition. The moisture present is conveniently removed by passing the chlorine gas through a series of drying towers containing a drying agent such as concentrated sulfuric acid. However, numerous other drying methods are also suitable.

Chlorine purifier 12 cools incoming gases by conventional means to a temperature of about 10 to −40 degrees centigrade and removes impurities in the chlorine during the exchange. The chlorine gas is then passed via line 14 to first stage compressor 16. For most efficient operation, it is preferred to effect the gas compression in more than one stage. The gas is compressed to 3 to about 15 atmospheres absolute or about 29 to about 220 pounds per square inch gauge. Preferably the gas is compressed to 5 to 12 atmospheres absolute or about 49 to about 160 pounds per square inch gauge. The preferred pressures are normally more economically obtained in two stages. Therefore, when more than one compression stage is used, the gas is compressed in a first stage to a pressure of about 29 to about 44 pounds per square inch gauge pressure or about 2 to about 3 atmospheres absolute, which causes a temperature rise to about 150 degrees centigrade. Alternately, if only one compression stage is used, the compression is effected to about 3 to 6 atmospheres absolute. Using such pressures, much higher temperatures result which may be undesirable.

Gas from first stage compressor 16 is passed via line 18 to intercooler 20. There, the heat of compression is removed by indirect heat exchange utilizing a heat transfer agent such as water. Intercooler 20 can also utilize direct contact cooling with liquid chlorine thus eliminating the water cooling.

The cooled pressurized gas from intercooler 20 is passed via line 21 to second stage compressor 22. In second stage compressor 22, the chlorine gas is compressed to the preferred pressure of about 49 to about 160 pounds per square inch gauge pressure or about 5 to about 12 atmospheres absolute. This compression again effects an increase in gas temperature of about 90 to about 150 degrees centigrade.

The pressure maintained in the system, from the compression stage through the liquefiers, is controlled by the pressure control device 36 and by the pressure setting for the blow gas. Compressors are used in adequate size, capacity and number to maintain the desired pressure in view of the pressure drop that occurs in cooling, condensing, recycling and releasing of blow gas. Thus the chlorine gas pressure in the liquefiers is substantially the same throughout.

It will be readily recognized that the compression stage can be effected in almost any number of steps with and without the intercooling steps. By varying the compression conditions, the maximum temperatures realized in the compressed gases can be controlled.

From second stage compressor 22, the compressed gas is passed via line 24 to primary liquefier 26. In primary liquefier 26, an indirect heat exchange is effected with a primary coolant, such as fresh water, sea water or a brine, supplied at a temperature below the $Cl_2$ dewpoint. Normally, water having a temperature of less than about 35 degrees centigrade is satisfactory to effect a sufficient heat transfer.

Sufficient heat exchange liquid is passed through primary liquefier 26 to reduce the temperature of the compressed gas to a few degrees above the coolant feed temperature, e.g., between about 40 and 0 degrees centigrade and preferably to below about 35 degrees centigrade. This cooling is of an amount sufficient to liquefy a large proportion of the $Cl_2$ gas, e.g., at least 50 percent and preferably 60 to 80 percent of the chlorine gas. The liquefied chlorine is removed from the liquefier via line 28 to liquid storage 30. Again, one or more primary liquefiers can be used to remove the heat of compression and cool the compressed gas to below its dew point.

The uncondensed chlorine gas is passed from primary liquefier 26 to secondary liquefier 34 via line 32. A portion of this gas is routed to pressure control device 36 via line 35 for recycle to interstage pressure via line 38. This recycle stabilizes compression operations at safe discharge temperatures and pressures as well as providing some interstage cooling. Some of the chlorine gas recycled through pressure control 36 is sent to suction pressure control 41 via lines 43 and 40 for return to the drying towers or to chlorine purifier 12. Recycle to the drying towers, provides for moisture control and/or aids in cooling the towers. The recycle through suction pressure control 41 is also used to maintain a constant suction pressure on the electrolytic cells which are normally used as the source of chlorine.

Chlorine gas leaving liquefier 26 has been cooled to a temperature preferably below about 35 degrees centigrade, but is still retained under substantial pressure. The cooled chlorine gas, other than that recycled via line 35 passes to secondary liquefier 34 via line 32. Secondary liquefier 34 effects the cooling of chlorine gas from primary liquefier 26, by an indirect heat exchange between liquid chlorine drawn from liquid storage 30 and fed to secondary liquefier 34 via line 42. Liquid chlorine from liquid storage 30 is partially vaporized at interstage pressure on one side of secondary liquefier 34, cooling and further liquefying compressed chlorine from stream 32 on the other side of liquefier 34. Conventional heat exchange equipment of suitable arrangement and materials can be employed. Since anhydrous chlorine is used in the condensing system, carbon steel or metals less subject to corrosion than carbon steel are used where contact is likely to be made with chlorine. Such addition metals as copper-nickel and other nickel alloys, etc., are also suitable materials of construction.

A partial evaporation of the liquid chlorine is effected in secondary liquefier 34 by reducing the pressure imposed on the chlorine liquid drawn from storage. The vaporized chlorine is vented to interstage pressure via line 44. Liquid chlorine refrigerant feed is normally controlled by a level or temperature controller.

The pressure reduction in liquefier 34 effects a substantial cooling and a further liquefaction of a proportion of the gaseous chlorine under pressure in the secondary liquefier by means of the indirect heat exchange. The heat exchange and cooling in the secondary liquefier is in an amount sufficient to reduce the temperature of the compresesd gas from about 40 to —40 degrees centigrade and preferably from below about 35 degrees centigrade to about —10 degrees centigrade. Such temperature is a few degrees above chlorine saturation temperature at interstage pressure. The chlorine liquefied in secondary liquefier 34 is passed from liquefier 34 to liquid storage 30 via line 46.

Scemondary liquefier 34 preferably reduces the temperature of the pressurized gas to a tempertture at which a substantial proportion of the compressed gas is liquefied under the prevailing pressure. Under such conditions, only a small percentage of the chlorine gas from the compression stage is uncondensed. If desired, this noncondensed gas can be passed to a tertiary liquefier. When operating with a tertiary liquefier, gaseous chlorine under a pressure substantially equal to that imposed by the final compression stage is passed from secondary liquefier 34 via line 50 to tertiary liquefier 48. Liquid chlorine, drawn from liquid storage 30 and passed through secondary liquefier 34 is drawn in sufficient quantities over and above that which is vaporized in a secondary liquefier 34 so as to feed liquid chlorine via line 52 to tertiary liquefier 48. The liquid chlorine passed to the tertiary liquefier 48 via line 52 is passed in indirect contact with the compressed chlorine gas in tertiary liquefier 48, thereby effecting an indirect heat exchange and further cooling of the compressed chlorine gas to a temperature in the range of 35 to—40 degrees centigrade. When a tertiary liquefier is used, the cooling to which the compressed gases are subjected, e.g., 40 to —40 degrees centigrade, is accomplished in two steps. Therefore the teriary liquefier cools to a lower temperature than that of the secondary liquefier, the cooling being in the range of 40 to —40 degrees centigrade.

The liquid chlorine coolant is used in the tertiary liquefier in a similar manner to the indirect heat exchange of the secondary liquefier. The chlorine liquid volatilized in tertiary liquefier 48 and any unvaporized residual liquid chlorine plus concentrated impurities are returned to chlorine purifier 12 via line 54 for recycle. The cooling effect of the expanding chlorine gas coolant in the tertiary liquefier causes the condensation of most of the pressurized chlorine gas in the tertiary liquefier. The liquefied chlorine is removed from tertiary liquefier 48 and sent to liquid storage 30 via line 56. Sufficient liquid chlorine is preferably drawn through line 54 to provide cooling and reflux to the chlorine in purifier 12.

The noncondensed gases passing through the tertiary liquefier 48 are passed from the system via line 58 as blow gases. Preferably the residual chlorine in the blow gas is recovered by a process such as that described in U.S. Patent 2,750,002. Normally, when a tertiary liquefier is used in the process, substantially all of the chlorine is liquefied in passing through it, the blow gas containing only a minor amount of chlorine. As a practical matter, most of the chlorine gas is condensed by the time it is passed through the secondary liquefier and, if desired, the third liquefier may often be omitted.

The invention will be readily understood with reference to the following example which is illustrative of certain preferred embodiments of the present invention. Unless otherwise indicated, all temperatures are in degrees centigrade and all parts and percentages are by weight.

EXAMPLE

The process illustrated in the drawing, was operated continuously, wherein chlorine was liquefied in a 100 ton per day plant operation. Dry chlorine gas was passed through a precooler-purifier wherein the chlorine gas was cooled from an incoming temperature of 27 degrees centigrade to a temperature of 10 degrees centigrade and was subsequently sent to a first stage compressor. In the first stage compressor, the chlorine gas was compressed to 35 pounds per quare inch gauge pressure. This compression caused a temperature increase to about 120 degrees centigrade. The compressed gas was then passed through an intercooler wherein water at about 23 degrees centigrade was passed in indirect heat exchange relationship with the compressed gas, thereby effecting a temperature reduction of the chlorine gas to about 30 degrees centigrade. In addition to the heat exchange effected by the water passed through the intercooler, further cooling was effected by the intermingling of expanding chlorine gases vented from the primary liquefier to the suction side of the second stage compressor.

Gases from the intercooler, were sent, under the first stage compression pressure, to a second stage compressor. In the second stage compressor, the chlorine gas was further compressed to 120 pounds per square inch gauge pressure which caused a temperature increase to about 120 degrees centigrade. Gases passing through the second stage compressor were sent to a primary liquefier at a rate of 12,500 pounds per hour. In the primary liquefier, 427 gallons of water per minute at a temperature of 23 degrees centigrade were passed in indirect contact with the compressed chlorine gas. The cooling water leaving the primary liquefier was at a temperature of 26.0 degrees centigrade. The temperature of the compressed chlorine gas was reduced to about 26 degrees centigrade. The cooling also condensed 8,930 pounds per hour of chlorine. The condensed chlorine was removed from the primary liquefier and sent to storage.

The uncondensed chlorine gas, under a pressure of 119 pounds per square inch gauge pressure and at a temperature of about 26 degrees centigrade was passed from the primary liquefier to a secondary liquefier at the rate of about 4,040 pounds per hour. Of this amount, about 1,670 pounds per hour were routed through a pressure control device for subsequent recycle to the compression stage, thereby aiding in cooling the first stage compressor gases. 2,370 pounds per hour of compressed gases were passed through the secondary liquefier wherein the compressed gases were passed in indirect contact with volatilizing liquid chlorine. Liquid chlorine, drawn from storage at a rate of about 2,740 pounds per hour, was passed through the shell of the secondary liquefier, wherein it was expanded and partially vaporized by indirect heat exchange relationship with the compressed chlorine gases. This heat exchange effected the condensation of approximately 2,000 pounds per hour of chlorine.

The cooling effect of the expanding chlorine gases, passed in indirect contact with the compressed gas, effected a temperature reduction of the compressed chlorine gases to a temperature of about 4.4 degrees centigrade. The vaporized chlorine, drawn from chlorine liquid storage, was removed from the secondary liquefier at a temperature of about −1.7 degrees centigrade. About 2,080 pounds per hour of chlorine was volatilized in the heat exchange. The expanded gases were recycled, at interstage pressure, back into the system. Thus, approximately 3,750 pounds per hour of chlorine gas from the primary and secondary liquefiers, were passed through the pressure control devices for recycle. The pressure control reduced the chlorine gas pressure from about 119 pounds per square inch gauge to about 34 pounds per square inch gauge. Of the gases passed through pressure control, about 2,080 pounds per hour were recycled to the suction side of the second stage compressor. The remaining gases were returned to the drying towers.

Noncondensed gases leaving the secondary liquefier amounted to about 370 pounds per hour. These gases were at a temperature of 4.4 degrees centigrade under a pressure of 118.5 pounds per square inch gauge. The gases were then passed to a tertiary liquefier wherein they were again passed in indirect heat exchange relationship with the residual liquid chlorine which had not volatilized in the secondary liquefier. This unvolatilized liquid chlorine flowed at a rate of about 650 pounds per hour through the tertiary liquefier. The liquid chlorine used for indirect cooling in the tertiary liquefier was vented to the precooler-purifier thereby effecting a reduction of pressure, an expansion of the chlorine gas and the resulting cooling effect. The heat exchange in the tertiary condenser effected the condensation of about 285 pounds per hour of chlorine which was sent to storage. The residual noncondensed gases passing through the tertiary liquefier were vented as blow gas. This gas amounted to about 72 pounds per hour. The blow gas vent was set at a release pressure of 118 pounds per square inch gauge, thereby maintaining the liquefiers under substantially equal pressure.

It will be readily seen that the invention can be modified by the elimination of a compression stage thereby effecting a higher compression in a single stage compression process. Also, due to the relatively small amount of noncondensed gas passing through the tertiary liquefier, this liquefier could also be eliminated and the gases recycled directly to the system with a provision for the release of blow gases. Further, it is apparent that additional compression and cooling stages could be utilized, if desired.

While there have been described various embodiments of the invention, the methods and elements described are not intended to be limiting the scope of the invention, since it is realized that changes therein are possible. It is intended that each element recited in any of the following claims is to be understood as referring to all equivalent elements for accomplishing substantially the same result in substantially the same or equivalent manner. It is intended to cover the invention broadly in whatever form the principles thereof may be realized.

What is claimed is:

1. A process for the liquefaction of chlorine gas, comprising:
 (a) passing gaseous chlorine through a chlorine purifier wherein it is cooled to a temperature of from about 10 to minus 40 degrees centigrade and impurities are removed therefrom;
 (b) compressing purified chlorine to a pressure of about 2 to about 3 atmospheres absolute, thereby causing the temperature of said gas to rise to about 90 to about 150 degrees centigrade;
 (c) cooling the compressed chlorine gas to remove the heat of compression;
 (d) further compressing the chlorine gas to a pressure of about 5 to about 12 atmospheres absolute, thereby causing the temperature of said gas to rise to about 90 to about 150 degrees centigrade;
 (e) cooling the chlorine gas compressed in step (d) by indirect heat exchange with water which is at a temperature below the dewpoint of the chlorine, thereby cooling said gas to a temperature of from about 40 to about 0 degrees centigrade and liquefying about 60 to about 80 percent thereof;
 (f) removing said liquefied gas;
 (g) passing a portion of compressed uncondensed chlorine gas from step (e) through an interstage pressure control device to the further compression stage step (d) to maintain interstage pressure;
 (h) cooling another portion of compressed uncondensed chlorine gas to a temperature of from about 40 to about minus 40 degrees centigrade by indirect heat exchange with volatilizing liquid chlorine, thereby liquefying a substantial proportion of said compressed uncondensed chlorine gas;
 (i) removing the gas generated by volatilizing said liquid chlorine in step (h) and passing a portion of said volatilized chlorine to said further compression stage of step (d) and passing another portion of said volatilized chlorine to suction pressure control;

(j) cooling the remaining portion of compressed uncondensed gas from step (h) by heat exchange with liquid chlorine obtained from step (h), thereby liquefying additional chlorine from the remaining uncondensed gas leaving a blow gas, while volatilizing the liquid chlorine;

(k) removing said liquefied additional chlorine;

(l) passing said volatilized chlorine to the chlorine purifier; and (m) withdrawing the blow gas.

2. The process of claim 1, wherein in step (e) the gas compressed in step (d) is cooled to a temperature of from about 35 to about 0 degrees centigrade.

3. The process of claim 2, wherein prior to being purified in step (a) said gaseous chlorine is dried, thereby removing moisture present therein.

References Cited

UNITED STATES PATENTS

| | | | |
|---|---|---|---|
| 1,584,376 | 5/1926 | Jewell | 62—11 |
| 1,876,551 | 9/1932 | Barstow et al. | 62—23 |
| 1,913,628 | 6/1933 | Falkenberg | 62—9 |
| 2,211,547 | 8/1940 | Reichart | 62—9 |
| 2,675,683 | 4/1954 | McGrath et al. | 62—197 |
| 2,754,666 | 7/1956 | Spitzer | 62—23 |
| 3,230,724 | 1/1966 | Havas | 62—11 X |

FOREIGN PATENTS 1,152,431  8/1963  Germany.

NORMAN YUDKOFF, *Primary Examiner.*

V. W. PRETKA, *Assistant Examiner.*